United States Patent

Hirst et al.

[11] Patent Number: 6,014,161
[45] Date of Patent: Jan. 11, 2000

[54] CLOSED LOOP COMPENSATION FOR GRAY SCALE PRINTING DEVICES

[75] Inventors: B. Mark Hirst; Mark Wibbels, both of Boise, Id.

[73] Assignee: Hewlett-Packard Company, Palo Alto, Calif.

[21] Appl. No.: 08/791,879

[22] Filed: Jan. 31, 1997

[51] Int. Cl.$^7$ ...................................................... B41J 2/435
[52] U.S. Cl. ........................ 347/252; 347/236; 347/237; 347/246; 347/247; 347/132; 347/135
[58] Field of Search ..................... 347/130, 132, 347/133, 135, 237, 236, 246, 247, 248, 252, 253; 369/58

[56] References Cited

U.S. PATENT DOCUMENTS

| | | | |
|---|---|---|---|
| 4,351,005 | 9/1982 | Imai et al. ............................... | 358/300 |
| 4,429,218 | 1/1984 | Thomas ................. | 250/214 R |
| 4,578,689 | 3/1986 | Spencer et al. ......................... | 347/129 |
| 4,754,291 | 6/1988 | Horikawa .............................. | 347/252 |
| 4,794,413 | 12/1988 | Yamazaki et al. ...................... | 347/247 |
| 4,835,781 | 5/1989 | Shoji ........................................ | 372/29 |
| 4,899,344 | 2/1990 | Shibata et al. ............................ | 372/29 |
| 4,914,459 | 4/1990 | Mama et al. ............................ | 347/133 |
| 5,017,944 | 5/1991 | Kitamura et al. ....................... | 347/252 |
| 5,144,337 | 9/1992 | Imamura et al. ....................... | 347/252 |
| 5,200,765 | 4/1993 | Hwai-Tzuu Tai ....................... | 347/240 |
| 5,602,814 | 2/1997 | Jaquette et al. .......................... | 369/58 |

*Primary Examiner*—N. Le
*Assistant Examiner*—Hai C. Pham

[57] ABSTRACT

A system and method of calibrating pulsewidth modulation of a laser. The output power of the laser is determined and a signal indicative of the output power is provided to a printer system control computer. The control computer calibrates the pulsewidth modulated signal responsive to the signal indicative of the output power. In a preferred embodiment, the control computer includes a lookup table or a mathematical model. The control computer compensates for timing variations in the pulsewidth modulated signal induced by system components and environmental operating conditions.

20 Claims, 2 Drawing Sheets

CLOSED LOOP COMPENSATION FOR GRAY SCALE PRINTING DEVICES

FIELD OF THE INVENTION

This invention relates in general to image transfer technology and, more specifically, to a laser power feedback system for a laser printing device.

BACKGROUND OF THE INVENTION

In color grayscale xerographic printing the laser pulsewidth is modulated to produce varying voltages on the drum surfaces and varying toner optical densities. This modulation results in pulsewidth differences on the order of nanoseconds, and corresponding small changes in incident energy to the drum. As the pulsewidth becomes smaller, errors in the absolute pulsewidth become a larger percentage of the total energy incident on the drum and the errors result in a larger visible optical density (OD) variation. This error in the incident energy is a result of normal variation in the manufacturing process of exposure system components and the operating environment, including supply voltage variation. This error results in significant instability in the exposure energy for the small pulsewidths and is very visible in the grayscale highlight regions.

To minimize the variation in component performance, higher quality, more tightly specified, components are necessary. These higher quality, more specified components increase the cost of the system.

It is common for grayscale printer manufacturers to use a lookup table process to compensate for average optical density performance and to generate proper gray scale colors. The average optical density performance is normally based on a sample of typical printers and includes the printer performance at small pulsewidths. Based on the average performance the lookup tables are modified to produce an acceptable average optical density over the grayscale range for the process colors. The process colors are yellow, magenta, cyan, black, red, green, and blue. This type of solution can compensate for average variation between the ideal and actual pulsewidths, but cannot compensate for variation in pulsewidth caused by component variation in individual printers. Typically lookup tables are implemented in the firmware of a printer. The lookup tables are not regenerated to account for variations in components among printers due to manufacturing processes, aging, or temperature change.

Several systems compensate for variation in the grayscale pulsewidths by forcing the user to perform a manual adjustment procedure to minimize the effects of pulsewidth error. This manual adjustment typically involves printing a pattern which compares a dithered or line screened highlight with a pure grayscale highlight. The user then must perform an adjustment to match the two highlights. This method is a usability problem, especially for network printers which are designed for little if any user interaction.

Screens and dithers are used to produce larger areas of color to minimize the apparent highlight density variation lines. This solution is very successful for printing methods which have very good addressability and resolution, but increasing addressability and resolution is very expensive for grayscale printers. With inexpensive color grayscale printers, the use of screens and dithers often produces a noticeable reduction in image quality.

To compensate for variations in laser characteristics an automatic power control (APC) process is carried out. In the APC process the laser diode is turned on before the page is printed and the laser power is measured using the detector in the laser's emitter detector pair. Alternatively an external sensor measures the laser power. This power variation is used to modify the drive current of the laser. This method compensates for the DC variation of the laser power, but not the system variations which affect the small grayscale pulses.

Accordingly, given the forgoing backgrounds relating to pulsewidth errors in laser printers, objects of the present invention are to provide a laser power feedback system for compensation of pulsewidth modulation in a laser printing device.

SUMMARY OF THE INVENTION

According to principles of the present invention in a preferred embodiment, a system and method provide closed loop compensation for timing variations in a laser printing device. The present invention implements a feedback system in a printer which measures the resultant output pulsewidth of the laser for a range of input grayscale pulsewidths. The pulsewidth is measured as a proxy for the total energy which cannot be measured directly. The total energy of a pixel is a function of the laser energy density and the pulsewidth. Measuring the resultant output pulsewidth of the laser and feeding this measurement back to the image forming computer allows compensation of all the components between the laser and the image forming computer. Since the feedback system is implemented in the printer itself, it also compensates for changing environmental conditions and the replacement of components in the printer's exposure system on a page by page basis. The system minimizes the differences for the entire pulsewidth range by measuring the incident pulse width and power density at a variety of pulsewidths and compensating accordingly.

Other objects, advantages, and capabilities of the present invention will become more apparent as the description proceeds.

DETAILED DESCRIPTION OF THE INVENTION

Figure 1:
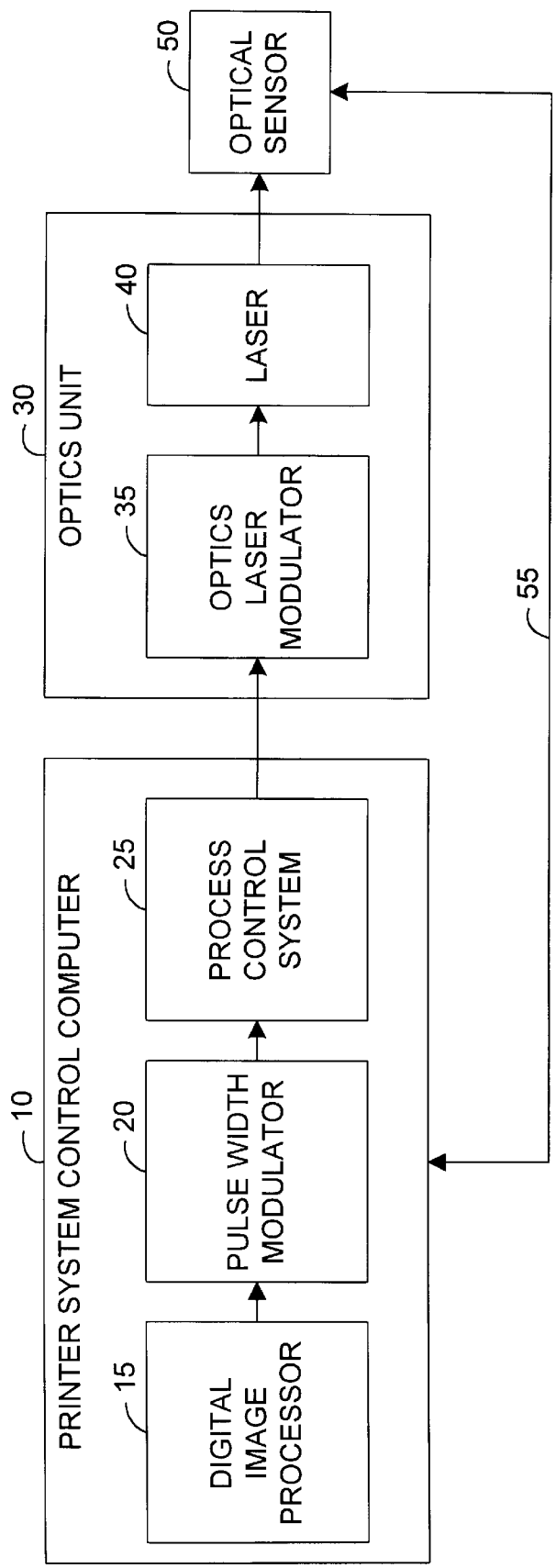
FIG. 1 is a block diagram of a laser printer with a preferred embodiment of the improvement of the present invention.

FIG. 1 shows a block diagram of a laser printer and a preferred embodiment of the present invention. Printer system control computer 10 receives character and graphic data in digital form from an external computer. From this data, printer system control computer 10 generates a pulsewidth modulated signal. Printer system control computer 10 is generally composed of several subsytems each with its own control computer. Typical subsytems of printer system control computer include digital image processor 15, digitally controlled pulsewidth modulator 20, and process control system 25. Digital image processor 15 receives the character and graphic data and determines an input pulsewidth code. Pulsewidth modulator 20 receives the input pulsewidth code from digital image processor 15 and outputs a pulsewidth modulated signal. The pulsewidth modulated signal passes through process control system 25 or is provided directly to optics unit 30. Process control system 25 is generally composed of many sub-systems. Sub-systems of process control system 25 typically include a paper path handling sub-system, an electrophotographic process control sub-system, and other sub-systems for controlling the printing process.

Optics unit 30 receives the pulsewidth modulated signal from printer system control computer 10 and outputs laser pulses. Optics unit 30 includes optics laser modulator 35 and laser 40. Optics laser modulator 35 receives the pulsewidth modulated signal from process control system 25 and controls the output power and time duration of a laser light pulse for laser 40. Laser 40 produces output laser pulses as directed by optics laser modulator 35.

Each of the components described above produces timing variations which cause the output laser pulsewidth to vary from the desired pulsewidth. Digital image processor 15 produces slight timing variations. The output of digitally controlled pulsewidth modulator 20 contains wide variations due to variations in manufacturing processes and device operating voltages and temperatures. Process control system 25 may introduce timing variations due to buffering of the pulsewidth modulated signal. The buffers of process control system 25 suffer from manufacturing induced timing variations as well as operating voltage and temperature variations. Optics laser modulator 35 and laser 40 suffer from large variability in their ability to reproduce the pulsewidth modulated signal into a resulting optical power pulsewidth.

The wiring system between components will also introduce timing variations due to parasitic capacitance and inductance of the wires and any additional bulk inductance from toroids. Toroids are components used to reduce radio frequency emissions. There are typically large variations in the value of bulk inductances which greatly alter the signal timing. Bulk inductance variations are typically greater than ±10 percent.

The improvement of the present invention includes optical sensor, or sensing means, 50 and feedback loop 55. Optical sensor 50 senses the laser power of the laser pulses produced by laser 40 and produces a corresponding feedback signal. Optical sensor 50 is preferably a PIN diode. The PIN diode preferably replaces the beginning of line or end of line phototransistor of a typical laser printer. A phototransistor is used in a typical laser printer to generate a beam detect signal. A PIN diode is able to generate a beam detect signal as well as measure the output laser power and pulse width. Thus, replacing the phototransistor is preferred because the number of components is not increased to accomplish the present invention.

Alternatively, the PIN diode is located very close to the exit window of the scanner assembly or the drum surface of the laser printer. Another alternative is to use fiber optics to carry the optical signal to optical sensor 50 located in printer system control computer 10 or digital image processor 15. Optical sensor 50 is, alternatively, a detector from the emitter detector pair of laser 40. Currently the detector from the emitter detector pair of a laser is less accurate than a PIN diode due to slower frequency response.

Feedback loop 55 provides the feedback signal to printer system control computer 10. Printer system control computer 10 receives the feedback signal and preferably generates a lookup table which correlates the output pulsewidth from laser 40 to the input pulsewidth code which is provided to pulsewidth modulator 20. Alternatively, printer system control computer 10 constructs an algorithm to correlate the output pulsewidth from laser 40 to the input pulsewidth code sent to pulsewidth modulator 20. The algorithm or lookup table preferably resides in digital image processor 15.

A lookup table is generated by sending desired pulsewidths, measuring the resulting pulsewidths and then generating a new lookup table. The data in the lookup table may be generated in many fashions, but preferably involves an iterative process. Table 1 shows an example of how a lookup table may be generated. As an example, the initial value of the input pulsewidth code may equal the desired pulsewidth. The input pulsewidth code is then sent to pulsewidth modulator 20 and the output pulsewidth of laser 40 is measured. New input pulsewidth codes are then generated for the lookup table. This process is repeated until the desired accuracy in the lookup table is reached.

Preferably, the lookup table or algorithm is generated upon power up of the printer. Additionally, a lookup table or algorithm may be generated as often as necessary to compensate for component changes such as temperature or age. Furthermore, a DC automatic power control process is preferably performed prior to generating the lookup table or algorithm. The DC automatic power control process, as discussed in the background, compensates for the DC variation of the laser power.

TABLE 1

| Desired Pulsewidth (ns) | Initial Pulsewidth Code | Measured Pulsewidth (ns) | Generated Pulsewidth Code |
|---|---|---|---|
| 5 | 5 | 3 | 7 |
| 6 | 6 | 4 | 8 |
| 7 | 7 | 5 | 9 |
| 8 | 8 | 6 | 10 |
| 9 | 9 | 7 | 10 |
| 10 | 10 | 9 | 11 |
| 11 | 11 | 11 | 11 |
| 12 | 12 | 12 | 12 |
| 13 | 13 | 13 | 13 |
| 14 | 14 | 14 | 14 |
| 15 | 15 | 15 | 15 |
| . | . | . | . |
| . | . | . | . |
| . | . | . | . |
| 254 | 254 | 254 | 254 |
| 255 | 255 | 255 | 255 |

Figure 2:
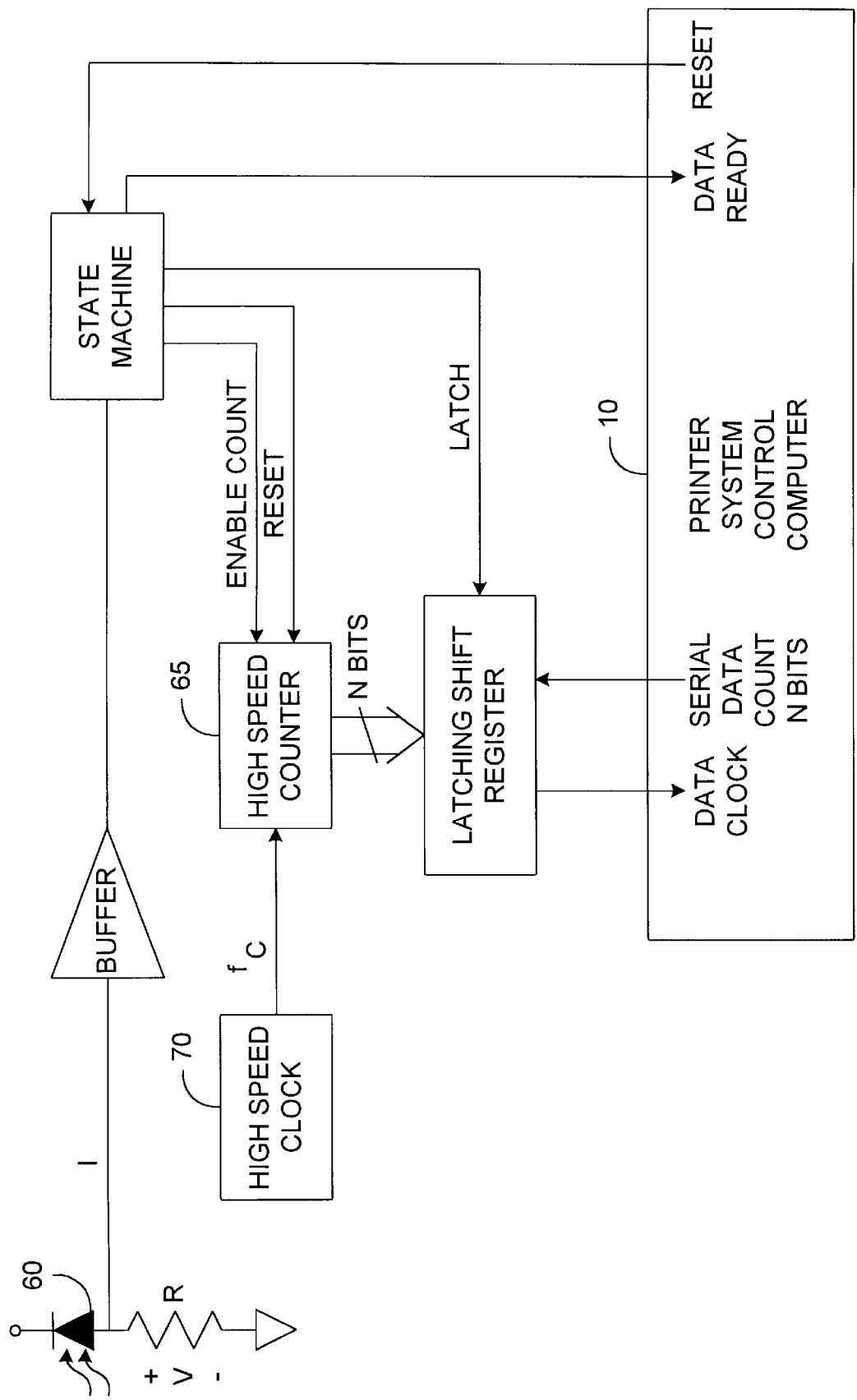
FIG. 2 is a circuit diagram of a preferred embodiment of the present invention for measuring the pulsewidth of a laser.

The output pulsewidth of laser 40 may be measured by several methods. FIG. 2 is a circuit diagram of a preferred method of the present invention for measuring the pulsewidth of an output laser pulse. Laser 40 produces output laser pulses which strike PIN diode 60. Current I is linearly proportional to the incident laser power striking PIN diode 60. Therefore, voltage V across resistor R is also linearly proportional to the incident laser power. After the pulsewidth modulated laser beam sweeps across the active surface of PIN diode 60, the counter value of high speed counter 65 is read. High speed counter 65 is incremented once for each clock cycle of high speed clock 70 while the laser power is pulsed on. Dividing the count of counter 65 by the rate of high speed clock 70 and the equivalent pixel width of PIN diode 60 produces an average pulsewidth.

The accuracy of the pulsewidth measurement is directly proportional to speed $f_c$ of high speed clock 70. For example, if clock speed $f_c$ is $1 \times 10^9$ Hz, an accuracy of 1 nano-second is achieved.

An alternate method for measuring a pulsewidth is to wait several pixels after observing activity on the PIN diode and then obtain a pulsewidth count for a single pixel. This count is representative of the pixel pulsewidth. This method is potentially less accurate than the previous method because only the pulsewidth of one pixel is considered.

Another alternative method is to obtain the output from an analog averaging circuit. The output of the analog averaging circuit is proportional to the input laser power, the pulsewidth, and the number of pulses that the PIN diode is exposed to during the raster scan. The value of the output of the analog averaging circuit is then divided by the value of the input laser power and the number of pulses to obtain the average pulsewidth.

Regardless of the method used to measure the pulsewidth, the count or pulsewidth measurement Information is provided to printer system control computer 10. Within printer system control computer 10, the information is preferably provided to digital image processor 15 where the lookup table or algorithm is generated. Alternatively, the information is provided to process control system 25 where the lookup table or algorithm is generated.

In summary, what has been described above are the preferred embodiments for a system and method compensating for signal variations in a laser printer. While the present invention has been described by reference to specific embodiments, it will be obvious that other alternative embodiments and methods of implementation or modification may be employed without departing from the true spirit and scope of the invention.

What is claimed is:

1. A system for calibrating pulsewidth modulation in a laser printer, components of the laser printer producing timing variations in a pulsewidth modulated signal, the timing variations producing variations in pulsewidth between a desired output pulsewidth and an actual output pulsewidth, the system comprising:

(a) means for selecting the desired output pulsewidth;

(b) means responsive to the desired output pulsewidth for producing the pulsewidth modulated signal;

(c) a laser for providing output pulses responsive to the pulsewidth modulated signal, the output pulses having the actual output pulsewidth;

(d) sensing means for sensing the actual output pulsewidth of said output pulses and providing a signal indicative of the actual output pulsewidth;

(e) calibration means for modifying the pulsewidth modulated signal responsive to the signal from said sensing means, said calibration means compensating for the variations in pulsewidth; and, (f) feedback means interconnecting said sensing means and said calibration means, said feedback means providing the signal from said sensing means to said calibration means.

2. The system of claim 1 wherein said laser includes a detector and said sensing means is the detector of the laser.

3. The system of claim 1 wherein said sensing means is a PIN diode.

4. The system of claim 1 wherein said sensing means is located near an exit window of a scanner assembly of the laser printer.

5. The system of claim 1 wherein said sensing means is located near a drum surface of the laser printer.

6. The system of claim 1 wherein said calibration means includes a printer system control computer.

7. The system of claim 1 wherein said calibration means includes a lookup table.

8. A method of calibrating a laser system, components of the laser system producing timing variations in a pulsewidth modulated signal, the timing variations producing variations in pulsewidth between a desired output pulsewidth and an actual output pulsewidth, the method comprising:

(a) selecting the desired output pulsewidth;

(b) producing the pulsewidth modulated signal responsive to the desired output pulsewidth;

(c) the laser system producing output pulses responsive to the pulsewidth modulated signal, the output pulses having the actual output pulsewidth;

(d) sensing the actual output pulsewidth of the laser system;

(e) providing a signal indicative of the actual output pulsewidth; and, (f) calibrating the pulsewidth modulated signal to compensate for the variations in pulsewidth, said calibrating responsive to the signal indicative of the actual output pulsewidth.

9. The method of claim 8 wherein the calibration is in a laser printer and said sensing is performed near an exit window of a scanner assembly of the laser printer.

10. The method of claim 8 wherein the calibration is in a laser printer and said sensing is performed near a drum surface of the laser printer.

11. The method of claim 8 wherein the laser system includes a detector and said sensing is performed by the detector of the laser system.

12. The method of claim 8 wherein said sensing is performed by a PIN diode.

13. The method of claim 12 wherein said PIN diode further detects the output pulses of the laser system and generates a beam detect signal.

14. The method of claim 8 further including repeating steps (a) through (f) for multiple desired output pulsewidths.

15. The method of claim 8 further including before step (d) performing an automatic power control process.

16. The method of claim 8 wherein said calibrating includes generating a lookup table for correlating the actual output pulsewidth of the laser system with an input pulsewidth code for generating the pulsewidth modulated signal.

17. The method of claim 8 wherein said calibrating includes generating an algorithm for correlating the actual output pulsewidth of the laser with an input pulsewidth code for generating the pulsewidth modulated signal.

18. A closed loop compensator for a laser printer having an output signal responsive to a pulsewidth modulated signal, the output signal including output pulses having an actual output pulsewidth, components of the laser printer producing timing variations in the pulsewidth modulated signal, the timing variations producing variations in pulsewidth between a desired output pulsewidth and the actual output pulsewidth, the compensator comprising:

(a) sensing means for sensing the output signal of the laser and providing a signal indicative of the output signal;

(b) calibration means for modifying the pulsewidth modulated signal responsive to the signal from said sensing means, said calibration means compensating for the variations in pulsewidth; and, (c) feedback means interconnecting said sensing means and said calibration means, said feedback means providing the signal from said sensing means to said calibration means.

19. The system of claim 18 wherein the laser includes a detector and said sensing means is the detector of the laser.

20. The system of claim 18 wherein said sensing means is a PIN diode.

* * * * *